Figure 4:
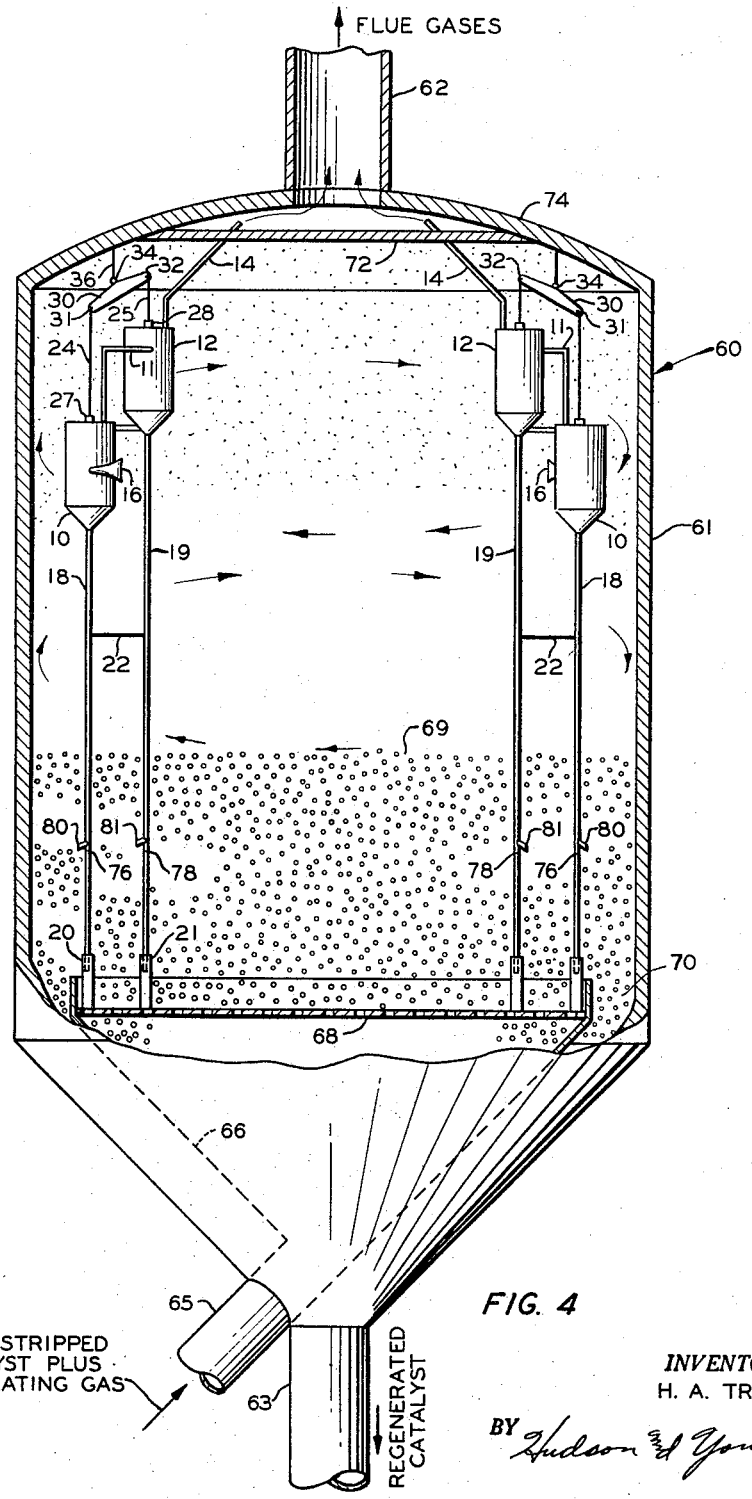

Sept. 15, 1959     H. A. TRAUE     2,904,410
ROTATABLE SUPPORT MEANS
Filed May 27, 1955     2 Sheets-Sheet 1
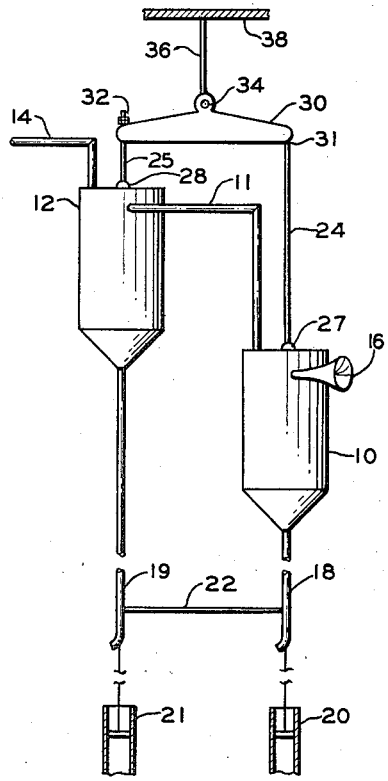
FIG. 1
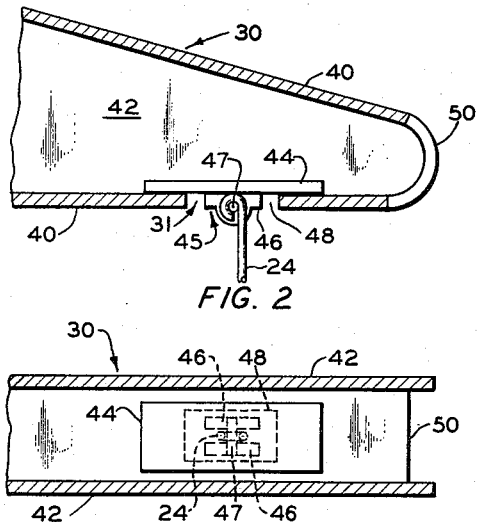
FIG. 2
FIG. 3
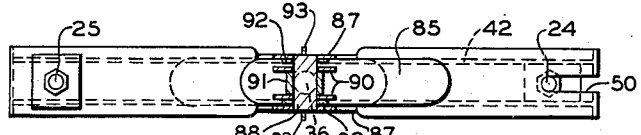
FIG. 6
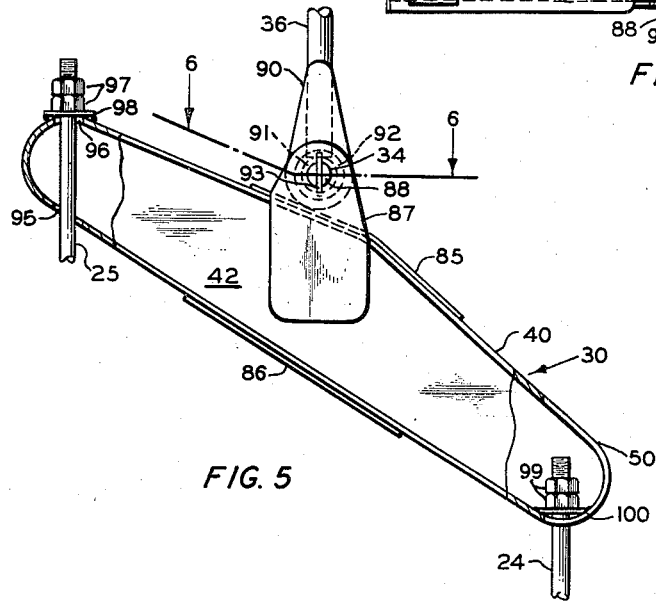
FIG. 5
INVENTOR.
H. A. TRAUE
BY Hudson and Young
ATTORNEYS United States Patent Office 2,904,410
Patented Sept. 15, 1959

2,904,410

ROTATABLE SUPPORT MEANS

Henry A. Traue, Bartlesville, Okla., assignor to Phillips Petroleum Company, a corporation of Delaware Application May 27, 1955, Serial No. 511,620

15 Claims. (Cl. 23—288)

This invention relates to rotatable support means for multipoint suspension. A specific aspect of the invention pertains to rotatable support means for dual point suspension of loads which are not free to rotate in a vertical plane and to apparatus utilizing such support means.

One application of the apparatus of the invention is in supporting first and second stage cyclone separators in a fluid catalytic cracking reactor or regenerator wherein support of rigidly connected cyclone separators at different levels by support rods of different lengths is required. In an apparatus of this type, a fluidized particulate solid is maintained in the lower section of the reactor and/or regenerator in dense phase and a dilute phase of the particles and suspending or fluidizing gas is maintained in an upper section of the vessel. The cyclones are conventionally arranged in pairs, the first stage separator being disposed at a lower level than the second stage separator and rigidly attached thereto with a communicating conduit from the upper section of the lower separator to the inlet of the upper separator. The dip legs or downcomer conduits from the bottom of the two separators extend downwardly into the dense phase of the particulate solid in the lower section of the vessel where they usually form a slidable joint with a fixed conduit or aligning element thereby permitting vertical movement of the dip legs or downcomers without permitting lateral movement thereof. In a currently used construction in a fluid catalytic cracking regenerator of this type each pair of first and second stage cyclones is suspended by two support rods from the dome of the vessel, one rod being attached to each cyclone. Due to the difference in length of the support rods unequal expansion takes place upon heating and cooling over a wide temperature range and it has been found that this has resulted in the breakage of one of the structural supports of the dome to which the supporting rods are attached.

My invention overcomes or compensates for the unequal expansion or lengthening of the support rods under high temperature conditions such as those prevailing in a fluid catalyst reactor or catalyst regenerator.

The principal object of the invention is to provide a load-equalizing support means for dual suspension of a load with elongated support rods under conditions which produce unequal expansion of the rods. Another object is to provide a rotatable support beam for dual-point suspension of non-rotatable loads. Another object is to provide rotatable support means for a pair of cyclone separators rigidly connected and disposed at different levels in non-rotatable arrangement. It is also an object of the invention to provide improved gas-solid separation apparatus. A further object is to provide improved support means which compensates for unequal expansion in depending support rods. Other objects of the invention will become apparent from a consideration of the accompanying disclosure.

My invention provides a novel rotatable support beam having a pivotal support intermediate its ends and providing pivotal bearings at its ends for depending support rods. The beam is adapted to suspend a load which is non-rotatable in a vertical plane and which has suspension points at different levels to which the support rods depending from the beam are attached. The support means disclosed herein equalizes the load on the support rods upon unequal lengthening or shortening of the rods without abnormal stress or strain in the load supporting system and the load.

More complete understanding of the invention may be had by reference to the schematic drawings of which Figure 1 is an elevation of one arrangement of the support means in combination with a first and a second stage cyclone separator as applied in separation of fluidized catalysts from the fluidizing gas; Figure 2 is a fragmentary elevation in partial section of one end of the support beam of Figure 1; Figure 3 is a plan view in partial section of the arrangement shown in Figure 2; Figure 4 is an elevation in partial section of a fluid catalytic cracking regenerator utilizing the support means of the invention; Figure 5 is an elevation of a preferred embodiment of the support beam of the invention showing the depending support rods and hanger supporting arrangement; and Figure 6 is a plan view of the beam shown in Figure 5.

Referring to Figure 1, a first stage cyclone separator 10 is rigidly connected through its effluent conduit 11 to a second stage cyclone separator 12 disposed at a substantially higher level. Effluent line 14 from separator 12 carries suspending or fluidizing gas out of the vessel in which the apparatus shown is disposed. Solid particulate material and fluidizing gas enters the first stage separator through line 16. Dip legs 18 and 19 extend downwardly from separators 10 and 12 into fixed conduits 20 and 21, respectively, with which they are slidably engaged. The pair of separators are tied together by a beam or rod 22 which, together with conduit 11, ties the separators into a rigid unitary structure.

The unitary structure described above is supported by support rods 24 and 25 which are connected by flexible joints 27 and 28 with separators 10 and 12, respectively, and these support rods are in turn suspended from and supported by a support beam 30. Support beam 30 is provided with flexible support means 31 and 32 at each end for rods 24 and 25 and with a pivotal support bearing 34 for suspension by a hanger rod 36 which is rigidly attached to a fixed support beam 38.

Figures 2 and 3 show schematically the detail of one arrangement of flexible support means 31 in rotatable support beam 30. Beam 30 comprises a sheet or metal covering 40 substantially enclosing a pair of opposed spaced-apart parallel elongated plates 42. Support rod 24 is supported from plate 44 by means of flexible joint 45 comprising a pair of U-members 46, supporting pin 47, which in turn is enclosed by a loop in the end of rod 24 or may be rigidly attached thereto. Plate 44 is supported on the upper surface of bottom sheet 40 of beam 30, an opening 48 being provided in sheet 40 for flexible joint 45 and rod 24. A slot 50 in the end of beam 30 is provided for insertion of plate 44 and attached U-members 46.

Referring to Figure 4, a catalyst regenerator 60 for regenerating fluidized catalysts comprises an enclosed vessel or shell 61 having a gaseous outlet conduit 62 and a solids outlet conduit 63. An inlet conduit 65 for introducing solid catalyst particles in dilute phase in a suspending regeneration gas enters the lower section of the reactor and terminates in a funnel member 66 which is provided with a perforate grid 68 through which the catalyst passes into the dense phase in the lower section of the vessel, the upper surface of which is designated by line 69. An annular passageway 70 between funnel and grid structure 66 and 68, respectively, and the vessel wall provides for the egress of regenerated solid catalyst particles from the lower section of the vessel into outlet conduit or standpipe 63 which connects with a gas feed line (not shown) for transporting the regenerated catalyst to a catalytic reactor (not shown). A tube sheet 72 in the upper section of vessel 60 below stack 62 seals off the stack from the subjacent section of the vessel.

The regeneration vessel 60 is provided with a plurality of pairs of primary and secondary cyclone separators 10 and 12, respectively, each pair being tied rigidly together as a unit and supported in accordance with the principles of the invention illustrated in Figure 1. A hanger rod or member 36 is rigidly attached to the supporting structure of the dome 74 of the regenerator. Rotatable support beam 30 is pivotally attached at 34 to hanger rod 36 and likewise pivotally attached at 31 and 32 to supporting rods 24 and 25 which connect by flexible joints 27 and 28 with separators 10 and 12, respectively. The length of rotatable support beam 30 is adjusted so that support rods 24 and 25 hang parallel when supporting the load of the separators. Gaseous effluent conduit 14 from the pair of separators passes through tube sheet 42 in sealed relation therewith so that this is substantially the only gas passageway between the interior of the regenerator and stack 62.

In order to provide an outlet for solids descending downcomers or dip legs 18 and 19, these conduits are sealed off at 76 and 78 by any suitable cut-offs and outlets 80 and 81 are provided in the conduits just above cut-offs 76 and 78 so that regenerated catalyst particles flow out of the downcomers into the dense phase of the catalyst bed.

Referring to Figures 5 and 6, the structure shown is a specific design or construction of a rotatable support beam particularly adapted for use in the regenerator structure shown in Figure 4 comprising an oblique support beam 30 constructed in a box-like arrangement from a pair of spaced-apart opposed parallel plates 42 bound together by sheet 40 which is welded or otherwise attached to the bounding edges of plates 42. The beam is outwardly arcuate at both ends and is provided with reinforcing or stiffening plates 85 and 86. The hanger means for beam 30 comprises a pair of parallel opposed external hanger plates 87 welded or otherwise rigidly attached externally to plates 42. Hanger plates 87 are provided with trunnions or bearings 34 through which a supporting pin 88 passes to form a rotatable joint. A second pair of opposed hanger plates 90 are welded or otherwise rigidly affixed to a hanger rod 36 and are provided with bearing surfaces through which pin 88 passes in engaging relation. A spacing sleeve 91 encircles pin 88 and is welded to hanger plates 90 at its ends and provides additional bearing surface. Washers or bearing plates 92 are welded to the inside of external hanger plates 87 to provide additional lateral bearing surface for the rotatable support joint. Keys 93 are welded onto the ends of pin 88 and are of a length greater than the diameter of the pin so as to prevent escape of the pin after assembly. External hanger plates 87 are welded in position on the support beam so that the longitudinal axes of same are substantially vertical when the beam is in operative position. Support rods 24 and 25 are pivotally attached to the ends of beam 30 so that they hang substantially parallel with the longitudinal axes of hanger plates 87.

Support rod 25 passes through openings 95 and 96 in sheet 40 and these openings are large enough to provide a small amount of variation in the position of the rod to accommodate rotation. The upper end of the rod is threaded and adjustably secured by nuts 97 and a washer-bearing plate 98 is positioned between the lower nut and sheet 40. Plate 98 rests on the arcuate end section of the upper end of the beam and takes the position of a generally horizontal tangent to the cooperating arcuate section. Support rod 24 which is attached to the lower end of beam 30 is also threaded on the upper end and provided with nuts 99. The lower nut rests on internal support plate 100 which is positioned so as to be substantially horizontal when beam 30 is in operating position or substantially parallel with washer-bearing plate 98.

Rotatable support beam 30 functions to equalize the weight on hanger rods 24 and 25. As the system is heated to high temperature during catalyst regeneration the longer support rod 24 expands a greater amount because of its greater length than support rod 25. This tends to reduce the pull on rod 24 and raise the upper contact surface of bearing 31. When this occurs beam 30 tends to become out of balance or equilibrium and rotates slightly, thereby raising the end of beam 30 in which bearing 31 is positioned and lowering the opposite end of the beam so that the beam is again in equilibrium with the force on rods 24 and 25. During this automatic adjustment as the system is raised in temperature, the structural unit comprising separators 10 and 12 is free to seek a lower level because of the flexibility of the slidable joints between dip legs 18 and 19 and aligning conduits 20 and 21, respectively.

The system has been described as one for specifically supporting cyclone type separators using a pair of hanger rods at opposite ends of the support beam; however, the rotatable support beam described has utility in supporting any type of non-rotatable load from two or more support points, it being feasible to utilize more than two support rods with proper adjustment of the positions of the hanger bearing and flexible joints at which the rods are attached so as to provide a support beam and supporting rods in equilibrium.

Certain modifications of the invention will become apparent to those skilled in the art and the illustrative details disclosed are not to be construed as imposing unnecessary limitations on the invention.

I claim:

1. Apparatus comprising in combination a pair of gas-solid separators disposed at different levels and attached to each other by connecting conduit means to form a rigid unit; a support beam pivotally supported intermediate its ends directly above said separators and free to rotate in a vertical plane; a first support rod pivotally suspended from one end of said beam and attached to one of said separators; and a second support rod pivotally suspended from the opposite end of said beam and attached to the other of said separators, whereby unequal expansion and contraction of said rods is compensated by rotation of said beam without placing added stress on the support structure and load.

2. The apparatus of claim 1 wherein said support beam is disposed obliquely.

3. The apparatus of claim 1 wherein said support beam is suspended from a sloping support member in spaced-apart relation thereto by a depending hanger, said beam extending generally parallel with said sloping support member.

4. The apparatus of claim 3 wherein said support rods are of different lengths.

5. The apparatus of claim 4 including a conduit depending from the bottom of each separator slidably engaging at its lower end a fixed aligning member, said conduit having outlet means for discharging contact material above said member.

6. Apparatus for effecting contacting between fluidized particulate contact material and a fluidizing gas, comprising an upright closed vessel having inlet means in a lower section for introducing fluidized solid, gas outlet means in an upper section and outlet means in a lower section for withdrawing solid particles; separation means in an upper section of said vessel for separating solid particles from gas and passing said gas to said gas outlet means comprising at least one pair of cyclone gas-solid separators rigidly connected to each other and disposed at different levels, an inlet and an outlet in each upper and lower separator, interconnecting conduit means between the outlet of the lower separator and the inlet of the upper separator of said pair, and conduit means connecting the outlet of said upper separator with the gas outlet from said vessel; and support means for said separators comprising a beam pivotally supported intermediate its ends on a hanger member depending from an upper closure section of said vessel, a first support rod pivotally suspended from one end of said beam and connected with one of said separators, and a second support rod pivotally suspended from the opposite end of said beam and connected with the other of said separators.

7. The apparatus of claim 6 wherein said upper closure section comprises an inwardly and upwardly sloping roof and said beam is disposed substantially parallel with said roof.

8. The apparatus of claim 7 wherein said vessel is cylindrical and said roof is of truncated conical configuration.

9. The apparatus of claim 7 including a depending solids conduit from each of said separators slidably engaging at its lower end a fixed aligning member and having solids outlet means in its lower section above said aligning member.

10. The apparatus of claim 9 including a transverse tube sheet across an upper section of said conical section sealing off the gas outlet means from the section of said vessel below said sheet, said effluent gas conduit means communicating with the space above said sheet through a gas tight joint with said sheet.

11. Apparatus comprising in combination a beam having pivotal support means intermediate its ends; a unitary rigid load having laterally spaced-apart attaching means; a first support rod pivotally attached at its upper end to one end of said beam and at its lower end to one of said attaching means; a second support rod of different length than first said rod, pivotally attached at its upper end to the opposite end of said beam and at its lower end to the other attaching means, said rods being substantially vertical, whereby unequal expansion and contraction of said rods is compensated by rotation of said beam without placing added stress on the support structure and load.

12. The apparatus of claim 11 wherein said load comprises a pair of elements disposed at different levels and rigidly attached to each other so as to be movable only as a unit.

13. The apparatus of claim 11 wherein said pivotal support beam comprises a pair of opposed, spaced-apart elongated plates bound into a unitary structure by an attached sheet encircling the edges of said plates; bearing means at each end of said structure for pivotally suspending a support rod; a pair of opposed hanger plates attached to first said plates parallel therewith and extending outwardly beyond said sheet intermediate said bearing means; and opposed trunnions in the extending sections of said hanger plates for a cooperating supporting pin to provide beam rotation.

14. The apparatus of claim 13 wherein said bearing means comprises an opening in said attached sheet between said opposed spaced-apart plates adjacent each end section, said openings being adapted to receive a rod in loose association so that a washer and nut on the end of said rod above each said opening provides vertically rotatable bearing means in cooperation with the surface adjacent said opening.

15. The apparatus of claim 13 constructed to be supported in an oblique position, one end being higher than the other, wherein the opening in said sheet in the high end extends through said sheet on both the top and bottom of said beam to provide a bearing around the opening on the top of said beam and said beam is outwardly arcuate at the higher end to provide a generally horizontal tangent at the opening position; wherein the low end of said beam is outwardly arcuate and the bearing means therein comprises an internal support extending across the arcuate section within said beam parallel with said tangent; and wherein said hanger plates are fixed on said opposed plates obliquely to the longitudinal axis thereof so that the axis of suspension thereof is perpendicular to said tangent.

References Cited in the file of this patent
UNITED STATES PATENTS

| | | |
|---|---|---|
| 374,478 | Jenkins | Dec. 6, 1887 |
| 1,501,590 | Floyd | July 15, 1924 |
| 1,871,519 | Hawley | Aug. 16, 1937 |
| 2,378,607 | Watts | July 19, 1945 |
| 2,568,149 | Grabe | Sept. 18, 1951 |
| 2,654,657 | Reed | Oct. 6, 1953 |
| 2,678,343 | Crask et al. | Aug. 24, 1954 |
| 2,698,224 | Brooke | Dec. 28, 1954 |